US012626306B1

(12) United States Patent

McAlister et al.

(10) Patent No.: US 12,626,306 B1
(45) Date of Patent: *May 12, 2026

(54) SYSTEMS AND METHODS FOR RECOMMENDING ACTION AFTER ASSESSING RISK OF PROPERTY DAMAGE

(71) Applicant: United Services Automobile Association (USAA), San Antonio, TX (US)

(72) Inventors: Richard McAlister, San Antonio, TX (US); Susan Dunham, San Antonio, TX (US); Randall Yarbrough, San Antonio, TX (US); Anthony Bishop, Fair Oaks Ranch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 16 days.

This patent is subject to a terminal disclaimer.

(21) Appl. No.: 18/404,528

(22) Filed: Jan. 4, 2024

Related U.S. Application Data

(63) Continuation of application No. 17/240,237, filed on Apr. 26, 2021, now Pat. No. 11,893,643, which is a continuation of application No. 15/210,678, filed on Jul. 14, 2016, now Pat. No. 10,997,664.

(60) Provisional application No. 62/220,089, filed on Sep. 17, 2015.

(51) Int. Cl.
| | |
|---|---|
| *G06Q 40/08* | (2012.01) |
| *G06Q 50/16* | (2012.01) |
| *G08G 1/017* | (2006.01) |

(52) U.S. Cl.
CPC ............. *G06Q 40/08* (2013.01); *G06Q 50/16* (2013.01); *G08G 1/017* (2013.01)

(58) Field of Classification Search
None
See application file for complete search history.

(56) References Cited

U.S. PATENT DOCUMENTS

| | | |
|---|---|---|
| 6,583,734 B2 | 6/2003 | Bates et al. |
| 7,049,980 B1 | 5/2006 | Chemelewski |
| 7,610,210 B2 | 10/2009 | Helitzer et al. |
| 7,821,421 B2 | 10/2010 | Tamir et al. |
| 7,949,330 B2 | 5/2011 | Yuhara et al. |
| 8,106,769 B1 | 1/2012 | Maroney et al. |
| 8,188,887 B2 | 5/2012 | Catten et al. |

(Continued)

FOREIGN PATENT DOCUMENTS

EP           3173817 A1    11/2016

*Primary Examiner* — Ayal I. Sharon
(74) *Attorney, Agent, or Firm* — Fletcher Yoder, P.C.

(57) ABSTRACT

A system may include one or more sensors that acquire location information associated with the one or more sensors. The system may also include a processor that receives a first set of data comprising environmental information associated with a location, receives the location information from the one or more sensors, and determines whether a risk of damage to property associated with at least one of the one or more sensors is greater than a threshold based on the location information and the environmental information. When the risk is greater than the threshold, the processor may send a notification including the risk of damage to the property to a computing device that may provide an audio or visual indication of the notification.

20 Claims, 3 Drawing Sheets

(56) References Cited

U.S. PATENT DOCUMENTS

| | | | |
|---|---|---|---|
| 8,289,160 B1 | 10/2012 | Billman | |
| 8,368,584 B2 | 2/2013 | Askelson et al. | |
| 8,400,299 B1 | 3/2013 | Maroney et al. | |
| 8,571,895 B1 | 10/2013 | Medina et al. | |
| 9,299,241 B1 | 3/2016 | Monical et al. | |
| 9,505,494 B1 | 11/2016 | Marlow et al. | |
| 9,646,351 B2* | 5/2017 | Harter | G06Q 40/123 |
| 9,656,606 B1 | 5/2017 | Vose et al. | |
| 9,691,103 B1 | 6/2017 | Hopkins, III | |
| 9,939,810 B1 | 4/2018 | Matheson et al. | |
| 10,023,201 B1 | 7/2018 | Fiedler et al. | |
| 10,166,916 B2 | 1/2019 | Bernico et al. | |
| 10,817,950 B1* | 10/2020 | Iqbal | G07C 5/008 |
| 10,846,800 B1* | 11/2020 | Bryant | G06Q 50/16 |
| 10,847,027 B1 | 11/2020 | Baker et al. | |
| 10,997,664 B1* | 5/2021 | McAlister | G06Q 40/08 |
| 11,436,924 B1* | 9/2022 | Gray | G06Q 40/08 |
| 11,441,922 B2* | 9/2022 | Iwaasa | G01C 21/3848 |
| 11,520,677 B1* | 12/2022 | Arazi | G06F 11/3065 |
| 11,665,184 B2* | 5/2023 | Monteil | H04L 41/40 726/23 |
| 2002/0041328 A1 | 4/2002 | LeCompte et al. | |
| 2005/0187714 A1 | 8/2005 | Brulle-Drews | |
| 2005/0216386 A1 | 9/2005 | Klugman | |
| 2005/0255842 A1 | 11/2005 | Dumas et al. | |
| 2008/0077474 A1 | 3/2008 | Dumas et al. | |
| 2009/0265193 A1 | 10/2009 | Collins et al. | |
| 2010/0007523 A1 | 1/2010 | Hatav | |
| 2010/0052947 A1 | 3/2010 | Lin et al. | |
| 2010/0145784 A1 | 6/2010 | Sriver et al. | |
| 2011/0161118 A1 | 6/2011 | Borden et al. | |
| 2012/0190386 A1 | 7/2012 | Anderson | |
| 2013/0096731 A1 | 4/2013 | Tamari et al. | |
| 2013/0100989 A1 | 4/2013 | Copeland et al. | |
| 2013/0135118 A1 | 5/2013 | Ricci | |
| 2013/0166607 A1* | 6/2013 | Turk | G06Q 50/14 707/E17.032 |
| 2014/0132409 A1 | 5/2014 | Billman et al. | |
| 2014/0277935 A1 | 9/2014 | Daman et al. | |
| 2014/0278574 A1 | 9/2014 | Barber | |
| 2015/0019266 A1 | 1/2015 | Stempora | |
| 2015/0025917 A1 | 1/2015 | Stempora | |
| 2015/0058047 A1* | 2/2015 | Turk | G06Q 50/40 705/4 |
| 2015/0073864 A1 | 3/2015 | Labrie et al. | |
| 2015/0178850 A1 | 6/2015 | Machnicki et al. | |
| 2015/0187017 A1 | 7/2015 | Weiss | |
| 2015/0230061 A1 | 8/2015 | Srivastava | |
| 2015/0324923 A1 | 11/2015 | Christensen et al. | |
| 2015/0365787 A1 | 12/2015 | Farrell | |
| 2016/0014564 A1 | 1/2016 | Vecchio et al. | |
| 2016/0165040 A1 | 6/2016 | Queru | |
| 2016/0343093 A1 | 11/2016 | Riland et al. | |
| 2017/0016266 A1 | 1/2017 | Van Wiemeersch et al. | |
| 2017/0017279 A1 | 1/2017 | Saeidi et al. | |
| 2017/0041739 A1 | 2/2017 | Kumar et al. | |
| 2017/0076396 A1 | 3/2017 | Sudak | |
| 2017/0169534 A1 | 6/2017 | Wani et al. | |
| 2018/0189750 A1 | 7/2018 | Nonaka et al. | |
| 2018/0190132 A1* | 7/2018 | Cronkhite | G08G 5/32 |
| 2020/0117690 A1* | 4/2020 | Tran | G10L 15/26 |
| 2022/0157141 A1* | 5/2022 | Hasan | G08B 29/188 |
| 2024/0160645 A1* | 5/2024 | Mabee | G06Q 50/26 |

* cited by examiner

RECEIVE DATA — 52

IS
RISK OF INJURY OR
DAMAGE GREATER THAN
THRESHOLD? — 54

NO

YES

DETERMINE
ACTION FOR REDUCING
RISK OF INJURY OR DAMAGE — 56

SEND NOTIFICATION
AND RECOMMENDED
ACTION TO COMPUTING DEVICE — 58

SYSTEMS AND METHODS FOR RECOMMENDING ACTION AFTER ASSESSING RISK OF PROPERTY DAMAGE

CROSS REFERENCE TO RELATED APPLICATIONS

This application is a continuation of and claims priority to and the benefit of U.S. application Ser. No. 17/240,237, entitled "SYSTEMS AND METHODS FOR RECOM- MENDING ACTION AFTER ASSESSING RISK OF PROPERTY DAMAGE," filed Apr. 26, 2021, which is a continuation of U.S. application Ser. No. 15/210,678, entitled "SYSTEMS AND METHODS FOR RECOM- MENDING ACTION AFTER ASSESSING RISK OF PROPERTY DAMAGE," filed Jul. 14, 2016, now U.S. Pat. No. 10,997,664, which claims priority to and the benefit of U.S. Provisional Application No. 62/220,089 entitled SYS- TEMS AND METHODS FOR RECOMMENDING ACTION AFTER ASSESSING RISK OF PROPERTY DAMAGE," filed Sep. 17, 2015, each of which is hereby incorporated by reference in its entirety for all purposes.

BACKGROUND

The present disclosure relates generally to monitoring various risk factors regarding property. More specifically, the present disclosure relates to assessing a risk of damage regarding property and recommending an action to mitigate the risk.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include one or more sensors that acquire location information associated with the one or more sensors. The system may also include a pro- cessor that receives a first set of data comprising environ- mental information associated with a location, receive the location information from the one or more sensors. The processor may then determine whether a risk of damage to property associated with at least one of the one or more sensors is greater than a threshold based on the location information and the environmental information. When the risk is greater than the threshold, the processor may send a notification including the risk of damage to the property to a computing device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclo- sure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

Figure 2:
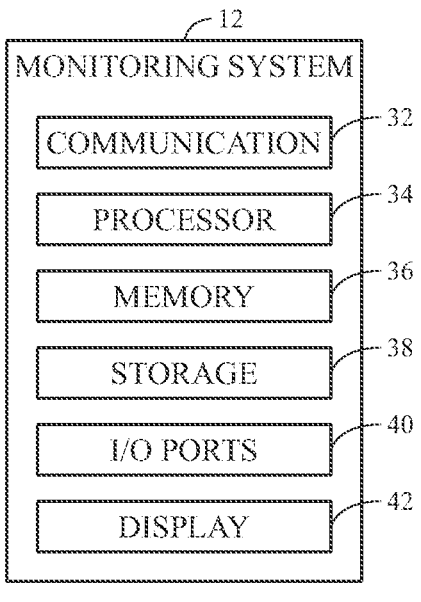
FIG. 2 illustrates a block diagram of a monitoring system employed by the risk monitoring system of FIG. 1, in accordance with embodiments described herein.
Figure 3:
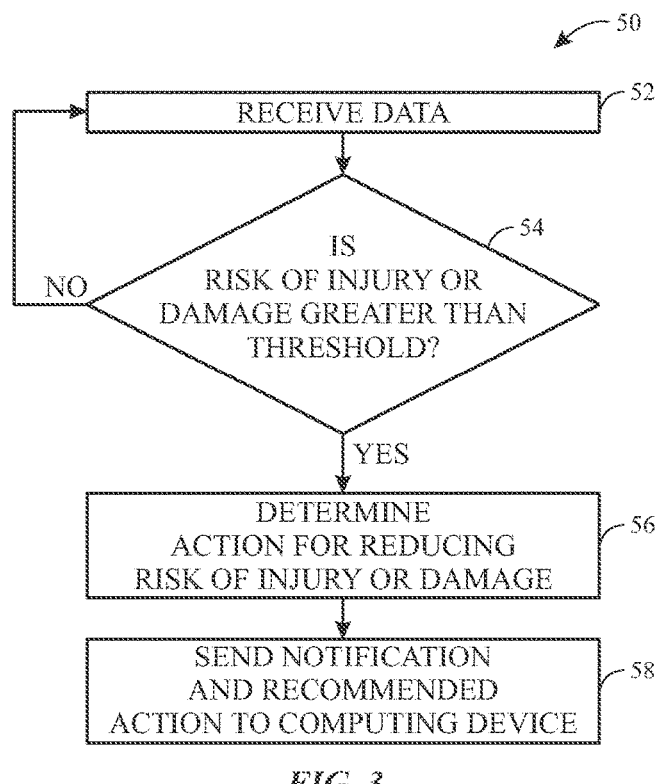
FIG. 3 illustrates a flow chart of a method for sending recommended actions for mitigating risk of damage to property, in accordance with embodiments described herein.
Figure 4:
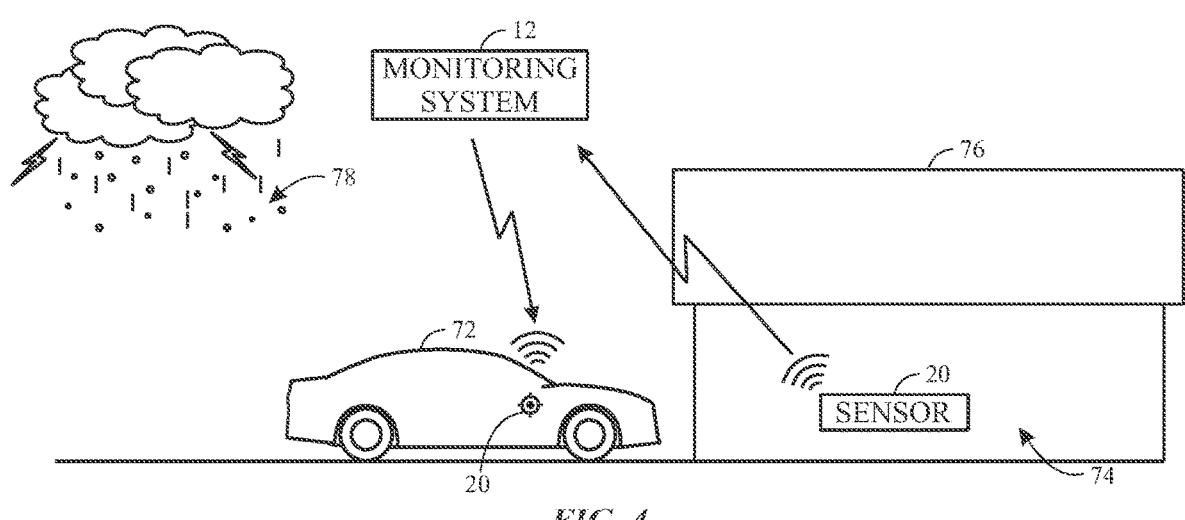
Figure 5:
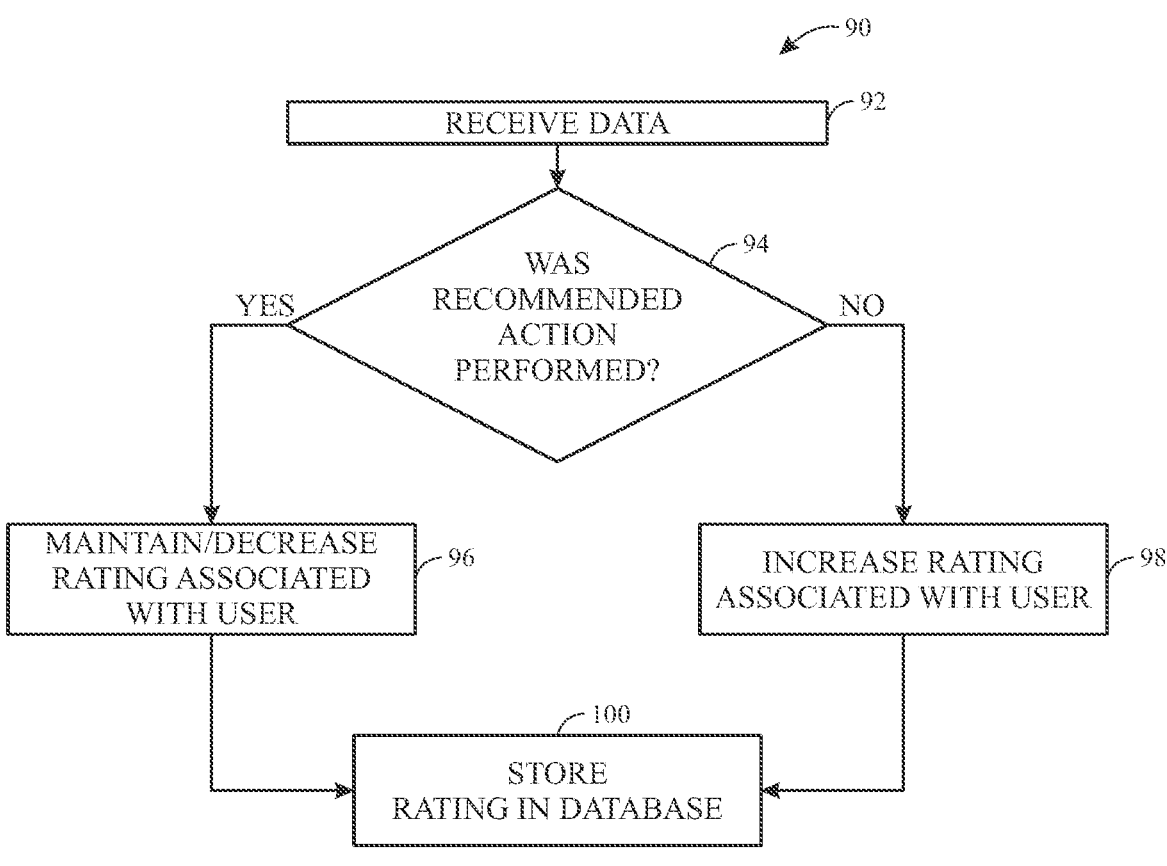

FIG. 4 illustrates a diagram of the monitoring system of FIG. 2 acquiring information from sensors disposed in a vehicle and a home that may be useful in determining recommended actions of the method of FIG. 3, in accor- dance with embodiments described herein; and FIG. 5 illustrates a flow chart of a method for updating a rating associated with a user, in accordance with embodi- ments described herein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous imple- mentation-specific decisions must be made to achieve the developers' specific goals, such as compliance with system- related and business-related constraints, which may vary from one implementation to another. Moreover, it should be appreciated that such a development effort might be com- plex and time consuming, but would nevertheless be a routine undertaking of design, fabrication, and manufacture for those of ordinary skill having the benefit of this disclo- sure.

Information regarding various aspects of an environment is readily available for use by a wide variety of software applications. For example, information regarding weather conditions present in a particular area may be accessible by a computing device via the Internet or some other electronic news source. Using weather information as an example, in certain embodiments, a monitoring system may track a location of an individual and determine whether the indi- vidual is at risk of encountering undesirable weather con- ditions based on his location and corresponding weather conditions. If the monitoring system determines that the risk of encountering the undesirable weather conditions is greater than some threshold, the monitoring system may send a recommended action to the individual to undertake in order to avoid or mitigate a risk of property or personal damage in light of the undesirable weather.

When insuring property that is at risk of damage due to certain weather conditions, insurance providers may also find it useful to leverage the availability of weather infor- mation and provide risk-mitigating recommendations for property owners to perform in light of unfavorable weather conditions. If the property owners perform the recom- mended actions, risk of damage to his property may be mitigated. For insurance providers, these risk-mitigating actions performed by individuals may reduce the amount of damage to property that may occur due to unfavorable weather conditions. Additionally, the performance of rec- ommended actions (which may be confirmed by sensing devices) by the individuals may provide insurance providers with valuable information regarding character traits of the individual. That is, individuals that perform the recommended actions may generally be associated with a lower risk category as compared to individuals that do not perform the recommended actions. Using this information, insurance providers may more accurately determine insurance coverage rates for individuals that regularly perform recommended actions. That is, the individuals that regularly perform recommended actions may prove to be associated with a lower risk of property damage and thus may be entitled to a lower insurance premium rate as compared to those individuals that do not perform the recommended actions.

Figure 1:
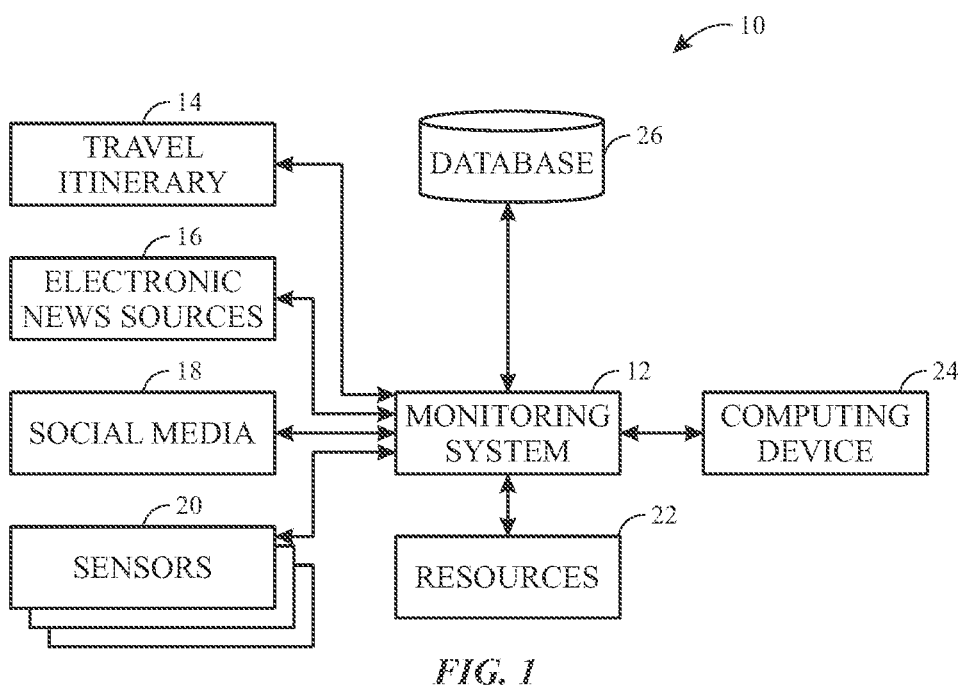
FIG. 1 illustrates a block diagram of a risk monitoring system, in accordance with embodiments described herein.

By way of introduction, FIG. 1 illustrates a block diagram of a risk monitoring system 10 that may include a monitoring system 12 that may receive data from various sources, determine whether a risk of damage to an individual or to property exceeds a threshold based on the data, and send a recommended action to a computing device for mitigating the risk of damage. The monitoring system 12 may generally be associated with an individual or a group of individuals (e.g., family). As such, the monitoring system 12 may receive data regarding the individual, the group of individuals, properties associated with the individual or the group, and the like. Additionally, the monitoring system 12 may receive data including environmental information associated with the location of the individual, the group of individuals, the properties of the individual or the group and the like. As mentioned above, the monitoring system 12 may receive this data from various sources to assist in assessing risk of injury to the individual or the group of individuals, as well as a risk of damage to property.

In certain embodiments, the monitoring system 12 may receive data from sources such as travel itinerary 14, electronic news sources 16, social media 18, sensors 20, and other resources 22. The travel itinerary 14 may include information regarding locations in which the individual or the group of individuals may be traveling. The travel itinerary 14 may be acquired by mining data sources such as emails, text messages, map software, and the like. In some embodiments, the travel itinerary 14 may be acquired by or directly input into the monitoring system 12 as a component of a mapping program that provides a recommended route (e.g., a route for a car) to a destination. The monitoring system 12 may actually adjust the route based on additional information. In certain embodiments, the monitoring system 12 may be associated with a travel services organization that may assist the individual in scheduling the itinerary for an upcoming trip. The travel services organization may thus provide the data regarding the travel itinerary 14.

The electronic news sources 16 may include various news services that may be updated in real time or near real time via a network (e.g., Internet). The electronic news sources 16 may provide information regarding weather alerts, natural disaster alerts, non-natural disaster alerts (e.g., traffic, active shooter), and any other information that may be published via an electronic news outlet such as a webpage, news database, or the like.

The social media 18 may include data available via social media sites such as Facebook®, Twitter®, and the like. In one embodiment, the social media 18 may be associated with the individual employing the monitoring system 12. For example, social media 18 associated with the location of a user or a destination of the user may be considered. The social media 18 may also include data trending on social media sites that may not be directly associated with the individual. The data from the social media 18 may include information regarding a natural disaster, dangerous situation (e.g., active shooter), and the like.

The sensors 20 may include any type of device capable of detecting location, moisture, temperature, light, and the like. One or more sensors 20 may be disposed on different types of property such as a home, a vehicle, and the like. In certain embodiments, one or more sensors 20 may be disposed within certain rooms of the home, outside the home, within the vehicle, or outside the vehicle. The sensors 20 may also be disposed on devices carried by or worn by individuals. For example the sensors may be disposed on mobile phones, wearable electronics, and the like. In one embodiment, the sensors 20 may provide location information regarding the sensors 20. As such, the sensors 20 may provide global positioning system (GPS) coordinates and the like to indicate a location of the sensors 20.

The resources 22 may include any other electronic information that may be available via a network, the Internet, or the like. In certain embodiments, the resources 22 may include additional information regarding the individual or the group of individuals. For example, the resources 22 may include data such as a residential address of an individual, a business address of the individual, information related to whether the individual works at home, whether the individual is associated with a particular organization (e.g., school) or group, and other information that may provide insight regarding a location of the individual at various times during the week.

As discussed above, the monitoring system 12 may receive data from the various sources described above and determine whether the individual, the group of individuals, or property associated with the individual or group is at risk of injury or damage. Upon determining that the risk is above some threshold, the monitoring system 12 may send a notification or alert to a computing device 24 associated with the individual or the group of individuals via a network. The monitoring system 12 and the computing device 24 may include any computing device such as a general-purpose computer, a mobile computing device, a laptop-computing device, a tablet computing device, a wearable computing device, and the like. Additional details with regard to the monitoring system 12 will be discussed below with reference to FIG. 2.

Upon receiving the notification, the computing device 24 may display the notification via a text message, an email message, an alert, or the like. The computing deice 24 may also provide an indication of the notification using audio outputs such as a ring, a tone, a chime, synthetic voice, and the like. In any case, the notification may provide a warning with regard to the likelihood of risk of injury or damage, an environmental condition associated with the risk, recommendations to reduce the risk of injury or damage, or the like. In some embodiments, the computing device 24 may automatically execute an application program stored on the computing device 24 to provide notice to the user of the computing device 24 of the alert, the environmental condition, the recommended actions, and the like. Additional details with regard to the notifications will be discussed with respect to FIGS. 3-5 below.

After sending the notification to the computing device 24, the monitoring system 12 may store data related to the notifications transmitted to the computing device 24 in a database 26. The monitoring system 12 may also store information regarding any determinations made by the monitoring system 12. For example, the monitoring system 12 may store the data acquired via the sensors 20 or the environmental information gleaned from the electronic news sources 16, the social media 18, the resources 22, or the like. Further, the monitoring system 12 may store recommended actions based on the acquired data. Additionally, the monitoring system 12 may store information regarding the behavior of the individual or the group of individuals based on the data gathered via the travel itinerary 14, the resources 22, and the like.

In one embodiment, after sending the notification to the computing device 24, the monitoring system 12 may determine whether recommendations indicated in the notification were performed based on data acquired by the sensors 20. Information regarding whether the recommended actions were performed may also be stored in the database 26. For example, if a recommendation was provided to move a user's vehicle to a safer location (e.g., a location protected from hail damage) or to avoid certain areas due to potential for damage (e.g., damage associated with a weather event), sensors may confirm that the vehicle was moved or did not enter the areas to be avoided.

To perform some of the actions set forth above, the monitoring system 12 may include certain components to facilitate these actions. FIG. 2 is a block diagram of example components within the monitoring system 12. For example, the monitoring system 12 may include a communication component 32, a processor 34, a memory 36, a storage 38, input/output (I/O) ports 40, a display 42, and the like. The communication component 32 may be a wireless or wired communication component that may facilitate communication between the monitoring system 12, the sensors 20, the database 26, and the computing device 24. Additionally, the communication component 32 may facilitate data transfer to the monitoring system 12 such that the monitoring system 12 may receive the travel itinerary 14, the electronic news sources 16, the social media 18, the resources 22, and the like.

The processor 34 may be any type of computer processor or microprocessor capable of executing computer-executable code. The processor 34 may also include multiple processors that may perform the operations described below.

The memory 36 and the storage 38 may be any suitable articles of manufacture that can serve as media to store processor-executable code, data, or the like. These articles of manufacture may represent computer-readable media (e.g., any suitable form of memory or storage) that may store the processor-executable code used by the processor 34 to perform the presently disclosed techniques. The memory 36 and the storage 38 may also be used to store the data, analysis of a comparison of the baseline image 14 and the online image data 16, various other software applications, and the like. The memory 36 and the storage 38 may represent non-transitory computer-readable media (e.g., any suitable form of memory or storage) that may store the processor-executable code used by the processor 34 to perform various techniques described herein. It should be noted that non-transitory merely indicates that the media is tangible and not a signal.

The I/O ports 40 may be interfaces that may couple to other peripheral components such as input devices (e.g., keyboard, mouse), sensors, input/output (I/O) modules, and the like. The display 42 may operate to depict visualizations associated with software or executable code being processed by the processor 34. In one embodiment, the display 42 may be a touch display capable of receiving inputs from a user of the monitoring system 12. The display 42 may be any suitable type of display, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen) that may function as part of a control interface for the monitoring system 12.

It should be noted that the components described above with regard to the monitoring system 12 are exemplary components and the monitoring system 12 may include additional or fewer components as shown. Additionally, it should be noted that the computing device 24 may also include similar components as described as part of the monitoring system 12.

With the foregoing in mind, FIG. 3 illustrates a flow chart of a method 50 employed by the monitoring system 12 for sending notifications regarding risk of injury or damage to an individual associated with the monitoring system 12. Although the following description of the method 50 is described in a particular order, it should be noted that the method 50 is not limited to the depicted order; and, instead, the method 50 may be performed in any suitable order.

Referring now to FIG. 3, at block 52, the monitoring system 12 may receive data. As discussed above, the monitoring system 12 may receive data from various sources, the data including the travel itinerary 14, the electronic news sources 16, the social media 18, the sensors 20, the resources 22, and the like. Generally, the data received at block 52 may provide information regarding the location of the individual, the group of individuals, or the property associated with the individual and the group of individuals. Additionally, the data may provide information regarding environment conditions (e.g., weather) and social conditions (e.g., traffic, social unrest, active shooter) within the vicinity or approaching the locations of the individual, the group of individuals, or the property associated with the individual and the group of individuals.

At block 54, the monitoring system 12 may determine a risk of injury to an individual or risk of damage to property is greater than some threshold. In one embodiment, the risk of injury or damage may be determined or estimated based on a number of factors. For example, the risk assessment may be based on the likelihood of the individual or property encountering the unfavorable conditions, empirical data regarding similar events occurring in similar areas, and the like.

If, at block 54, the monitoring system 12 determines that the risk of injury or damage is not greater than the threshold, the monitoring system 12 may return to block 52. If, however, the monitoring system 12 determines that the risk of injury or damage is greater than the threshold, the monitoring system 12 may proceed to block 56.

At block 56, the monitoring system 12 may determine an action for reducing risk of injury or damage. The action may generally be related to moving the location of the individual or the property such that the risk of injury or damage is mitigated. For instance, the action may include a recommended evacuation route for the individual to take if the risk of a natural disaster (e.g., hurricane) occurring within a vicinity of the individual is greater than some threshold. In the same manner, if the monitoring system 12 determines that the individual will be traveling to or through a location that may be under civil unrest, the monitoring system 12 may recommend cancelling the trip or rerouting the trip to avoid impacted areas.

Keeping the foregoing in mind, FIG. 4 illustrates another example scenario that may facilitate a better understanding of the method 50 being performed by the monitoring system 12. As shown in FIG. 4, the monitoring system 12 may receive data from the sensors 20 indicating the location of a vehicle 72 (e.g., property) and a status (e.g., occupied) of a garage 74 within a house 76.

By way of example, the monitoring system 12 may receive data (block 52) from the electronic news source 16 indicating that a hailstorm 78 is approaching the location of the vehicle 72. If the risk of the hailstorm 78 producing hail that may damage the vehicle 72 is greater than some threshold (block 54), the monitoring system 12 may determine an action (block 56) to mitigate the risk of damage. For instance, the recommended action may include moving the vehicle 72 into the garage 74, thereby eliminating the risk of hail damaging the vehicle 72.

Referring back to FIG. 3, at block 58, the monitoring system 12 may send a notification of the determined risk and recommended actions to mitigate the risk to the computing device 24. In this manner, the individual associated with the computing device 24 may take preventative actions to mitigate the risk of injury to himself or damage to his property.

In certain embodiments, feedback data regarding whether the individual performed the recommended action may be received by the monitoring system 12. In this case, the monitoring system 12 may maintain a rating or score regarding the individual to better assess an insurance risk associated with the individual. Additionally, the monitoring system 12 may track whether the recommended action was performed or not and store the corresponding data in the database 26. For example, a location of the vehicle 72 may be tracked via a sensor and a location (e.g. coordinates) of the garage 74 may be known such that parking the vehicle 72 in the garage can be confirmed. In some embodiments, sensors 20 may be installed in a user's property (e.g., home or garage) to confirm compliance with certain risk reducing recommendations.

Keeping this in mind, FIG. 5 illustrates a flow chart of a method 90 for tracking a performance of an individual via the monitoring system 12. As mentioned above with regard to FIG. 3, although the following description of the method 90 is described in a particular order, it should be noted that the method 90 is not limited to the depicted order; and, instead, the method 90 may be performed in any suitable order. In one embodiment, the method 90 may be performed after the method 50 is performed to determine whether the recommended actions were performed.

At block 92, the monitoring system 12 may receive data from the sensors 20. As mentioned above, the sensors 20 may be a sensor used to detect location, temperature, humidity, and the like. At block 94, the monitoring system 12 may determine whether the recommended action (e.g., from block 56) was performed. As such, the monitoring system 12 may use the data acquired from the sensors 20 to determine whether the recommended action was performed.

Referring back to the example scenario depicted in FIG. 4, the monitoring system 12 may determine whether the vehicle 72 was moved inside the garage 74 after the computing device 24 received the notification at block 58. That is, the monitoring system 12 may use data from the sensor 20 disposed on the vehicle 72 to determine whether the vehicle was moved into the garage 74. In one embodiment, the monitoring system 12 may use the data from the sensor 20 disposed in the garage 74 to verify that the vehicle 72 was inside the garage 74.

In addition to the location information retrieved from the sensors 20, the monitoring system 12 may deduce whether the recommended actions were performed based on other data received from the sensors 20. For example, if the sensors 20 disposed on the vehicle 72 and the garage 74 provided temperature measurements, the monitoring system 12 may deduce that the vehicle 72 is in the garage 74 if the temperature measurements were substantially similar (e.g., within some threshold).

If the monitoring system 12 determines that the recommended action was performed, the monitoring system 12 may proceed to block 96 and increase a rating or score associated with the individual performing the action. Alternatively, if the monitoring system 12 determines that the recommended action was not performed, the monitoring system 12 may proceed to block 98 and maintain or decrease a rating or score associated with the individual requested to perform the action.

In either case, at block 100, the monitoring system 12 may store the rating or score in the database 26. Additionally, the monitoring system 12 may store information regarding whether the individual performed the recommended action or not in the database 26. This information may be useful to insurance providers and the like to assess the individual as an insurance policy holder. In one embodiment, the system 10 may automatically adjust a particular user's insurance rates based on accumulated or instant feedback from the rating or score for the particular user.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A method, comprising:

determining, via a processing system, an expected location of a mobile object by identifying an additional expected location of an individual associated with the mobile object from information pertaining to the individual, wherein the information comprises a travel itinerary, an electronic news source, social media data, or any combination thereof;

estimating, via the processing system, a risk of damage to the mobile object or the individual based on the expected location and one or more trends indicated in the social media data provided by one or more social media sites;

determining, via the processing system, whether the risk of damage is greater than a threshold;

sending, via the processing system, a notification comprising the risk of damage to a computing device associated with the individual in response to the risk of damage being greater than the threshold, wherein the notification comprises one or more recommended actions to move the mobile object for mitigating the risk of damage;

verifying, via the processing system, that the mobile object has moved from the expected location, by:

acquiring, via a first light sensor, a first light measurement at the expected location;

acquiring, via a second light sensor, a second light measurement associated with the mobile object;

determining, via the processing system, whether the first light measurement and the second light measurement are within a threshold light differential;

determining, via the processing system, the mobile object is not at the expected location in response to the first light measurement and the second light measurement being outside the threshold light differential; and

providing, via the processing system, an indication of results of the verifying to an electronic device.

2. The method of claim 1, wherein the electronic news source provides data regarding one or more weather alerts, one or more natural disaster alerts, one or more non-natural disaster alerts, or any combination thereof.

3. The method of claim 1, wherein estimating the risk of damage is based on empirical data associated with an event at the expected location.

4. The method of claim 1, comprising receiving, via the processing system, feedback data associated with whether the mobile object has moved from the expected location based on the indication of the results of the verifying.

5. The method of claim 1, comprising storing, via the processing system, the indication of the results in a database.

6. The method of claim 1, comprising maintaining, via the processing system, a rating associated with the individual based on the indication of the results.

7. The method of claim 6, comprising increasing, via the processing system, the rating associated with the individual based on the indication of the results comprising that the mobile object has moved from the expected location.

8. The method of claim 6, comprising maintaining or decreasing, via the processing system, the rating associated with the individual based on the indication of the results comprising that the mobile object has not moved from the expected location.

9. The method of claim 6, comprising storing, via the processing system, the rating associated with the individual in a database.

10. The method of claim 1, wherein the first light sensor is disposed within a structure.

11. The method of claim 10, wherein the second light sensor is disposed on the mobile object.

12. The method of claim 1, wherein the social media data is indicative of the one or more trends on the one or more social media sites that are not directly associated with the individual.

13. The method of claim 1, comprising determining, via the processing system, the travel itinerary based at least in part on an email, a text message, map software, or any combination thereof.

14. A system comprising,
a first light sensor configured to detect a first light measurement at a first location;
a second light sensor configured to detect a second light measurement associated with a mobile object; and
a processing system configured to:
determine an expected location of the mobile object by identifying an additional expected location of an individual associated with the mobile object from information pertaining to the individual, wherein the information comprises a travel itinerary, an electronic news source, social media data, or any combination thereof;
estimate a risk of damage to the mobile object or the individual based on the expected location and one or more trends indicated in the social media data provided by one or more social media sites;
determine whether the risk of damage is greater than a threshold;
send a notification comprising the risk of damage to a computing device associated with the individual in response to the risk of damage being greater than the threshold, wherein the notification comprises one or more recommended actions to move the mobile object for mitigating the risk of damage;

verify that the mobile object has moved from the first location, by:
acquiring, via the first light sensor, the first light measurement at the first location;
acquiring, via the second light sensor, the second light measurement;
determining whether the first light measurement and the second light measurement are within a threshold light differential;
determining that the mobile object is not at the first location in response to the first light measurement and the second light measurement being outside the threshold light differential; and
provide an indication of results of the verifying to an electronic device.

15. The system of claim 14, wherein the social media data is indicative of the one or more trends on the one or more social media sites that are not directly associated with the individual.

16. The system of claim 14, wherein the processing system is configured to maintain a rating associated with the individual based on the indication of the results.

17. The system of claim 16, wherein the processing system is configured to adjust a rate of the individual based on the rating.

18. The system of claim 14, wherein the information comprises data from one or more emails, one or more text messages, one or more travel service organizations, or any combination thereof.

19. A non-transitory computer-readable medium comprising computer-executable instructions configured to cause a processing system to:
determine an expected location of a mobile object by identifying an additional expected location of an individual associated with the mobile object from information pertaining to the individual, wherein the information comprises a travel itinerary, an electronic news source, social media data, or any combination thereof;
estimate a risk of damage to the mobile object or the individual based on the expected location and one or more trends indicated in the social media data provided by one or more social media sites;
determine whether the risk of damage is greater than a threshold;
send a notification comprising the risk of damage to a computing device associated with the individual in response to the risk of damage being greater than the threshold, wherein the notification comprises one or more recommended actions to move the mobile object for mitigating the risk of damage;
verify that the mobile object has moved from the expected location, by:
acquiring, via a first humidity sensor, a first humidity measurement at the expected location;
acquiring, via a second humidity sensor, a second humidity measurement of the mobile object;
determining whether the first humidity measurement and the second humidity measurement are within a threshold humidity differential;
determining that the mobile object is not at the expected location in response to the first humidity measurement and the second humidity measurement being outside the threshold humidity differential; and
providing an indication of results of the verifying to an electronic device.

20. The non-transitory computer-readable medium of claim 19, wherein the information comprises a residential address, a business address, a particular location on a particular day of a week, or any combination thereof.

\* \* \* \* \*